(12) United States Patent
Terorde et al.

(10) Patent No.: US 12,371,382 B2
(45) Date of Patent: Jul. 29, 2025

(54) STAR-SHAPED CERAMIC BODY FOR USE AS CATALYST

(71) Applicant: BASF SE, Ludwigshafen am Rhein (DE)

(72) Inventors: Robert Terorde, De Meern (NL); Harry Bouwman, De Meern (NL); Willem Dijkstra, De Meern (NL); Stefan Lipp, Ludwigshafen am Rhein (DE); Matthias Georg Schwab, Ludwigshafen am Rhein (DE)

(73) Assignee: BASF SE, Ludwigshafen Am Rhein (DE)

( * ) Notice: Subject to any disclaimer, the term of this patent is extended or adjusted under 35 U.S.C. 154(b) by 536 days.

(21) Appl. No.: 17/797,737

(22) PCT Filed: Feb. 4, 2021

(86) PCT No.: PCT/EP2021/052637
§ 371 (c)(1),
(2) Date: Aug. 5, 2022

(87) PCT Pub. No.: WO2021/156351
PCT Pub. Date: Aug. 12, 2021

(65) Prior Publication Data
US 2023/0108558 A1 Apr. 6, 2023

(30) Foreign Application Priority Data
Feb. 7, 2020 (EP) .................................... 20156102

(51) Int. Cl.
C04B 35/10 (2006.01)
B01J 21/04 (2006.01)
(Continued)

(52) U.S. Cl.
CPC ............... *C04B 35/10* (2013.01); *B01J 21/04* (2013.01); *B01J 21/08* (2013.01); *B01J 35/50* (2024.01);
(Continued)

(58) Field of Classification Search
None
See application file for complete search history.

(56) References Cited

U.S. PATENT DOCUMENTS 4,370,261 A 1/1983 Wunder et al.
6,527,846 B1 * 3/2003 Beham .................. A61K 6/827
501/71
(Continued)

FOREIGN PATENT DOCUMENTS

EP 0020963 A2 1/1981
EP 0423694 A1 4/1991
(Continued)

OTHER PUBLICATIONS

International Preliminary Report on Patentability received for PCT Patent Application No. PCT/EP2021/052637, mailed on Jan. 14, 2022, 5 pages.
(Continued)

*Primary Examiner* — John J Figueroa
(74) *Attorney, Agent, or Firm* — Faegre Drinker Biddle & Reath LLP

(57) ABSTRACT

Star-shaped ceramic body, wherein the cross-section of the body has six lobes, the ratio of the maximum radius r2 in the star to radius r1 of a circle connecting the intersections of the lobes being in the range from 1.0 to 3.61, preferably from 2.17 to 3.61, the ratio of the area F1 inside this circle to the summed area F2 of the lobes outside this circle being in the range of from 0.54 to 0.90, the ratio of the distance x2 between the two intersections I of one lobe with neighboring
(Continued)

lobes and the radius r1 of the circle being in the range of from 0.67 to 1.11. The ceramic body is used as catalyst-support.

18 Claims, 3 Drawing Sheets

(51) Int. Cl.
  *B01J 21/08* (2006.01)
  *B01J 35/50* (2024.01)
  *B01J 35/63* (2024.01)
  *B01J 37/08* (2006.01)
  *C04B 35/14* (2006.01)
  *C04B 38/00* (2006.01)
  *C04B 41/00* (2006.01)
(52) U.S. Cl.
  CPC ............... *B01J 35/63* (2024.01); *B01J 37/08* (2013.01); *C04B 35/14* (2013.01); *C04B 38/0051* (2013.01); *C04B 41/0072* (2013.01); *C04B 2235/3217* (2013.01); *C04B 2235/3418* (2013.01); *C04B 2235/6021* (2013.01); *C04B 2235/606* (2013.01); *C04B 2235/94* (2013.01)

(56) References Cited

U.S. PATENT DOCUMENTS

| | | | | |
|---|---|---|---|---|
| 2007/0258882 | A1* | 11/2007 | Castellano | C01B 3/326 502/329 |
| 2011/0160104 | A1* | 6/2011 | Wu | C09K 8/80 507/269 |
| 2013/0122250 | A1* | 5/2013 | Nishi | B32B 3/02 428/141 |
| 2013/0212952 | A1* | 8/2013 | Welygan | B23K 26/0821 51/309 |
| 2014/0162001 | A1* | 6/2014 | Schulte | B82Y 30/00 252/502 |
| 2019/0375686 | A1* | 12/2019 | Lanzenberger | C04B 35/62665 |

FOREIGN PATENT DOCUMENTS

| | | | | |
|---|---|---|---|---|
| EP | 2231559 | B1 | 5/2012 | |
| WO | WO-9205870 | A1 * | 4/1992 | ............. B01J 35/02 |
| WO | 99/58480 | A1 | 11/1999 | |
| WO | 00/25918 | A1 | 5/2000 | |
| WO | 2004/076389 | A1 | 9/2004 | |
| WO | 2009/074461 | A1 | 6/2009 | |
| WO | 2017/065970 | A1 | 4/2017 | |
| WO | 2019/055220 | A1 | 3/2019 | |
| WO | 2019/229061 | A1 | 12/2019 | |

OTHER PUBLICATIONS

Kirk-Othmer, "Encyclopedia of Chemical Technology", 3rd Edition, vol. 2, 13 pages.
Rouquerol et al., "Commission on Colloid and Surface Chemistry Including Catalysis," Pure and Applied Chemistry, vol. 66, No. 8, 1994, pp. 1752 to 1753.
Sandstede et. al., "Gravimetrische Bestimmung der Gassorption mit Hilfe einer elektronischen Mikrowaage," Chem. Ing. Tech., vol. 32, No. 6, 1960, pp. 413-417.
International Search Report and Written Opinion received for PCT Patent Application No. PCT/EP2021/052637, mailed on Apr. 7, 2021, 10 pages.

* cited by examiner

STAR-SHAPED CERAMIC BODY FOR USE AS CATALYST

CROSS-REFERENCE TO RELATED APPLICATIONS

This application is a national stage application (under 35 U.S.C. § 371) of PCT/EP2021/052637, filed Feb. 4, 2021, which claims benefit of European Application No. 20156102.4, filed Feb. 7, 2020, both of which are incorporated herein by reference in their entirety.

DESCRIPTION

The invention is directed to ceramic bodies, preferably alumina or silica bodies or extrudates, suitable as catalyst, or as catalyst support, and the use of such bodies or extrudates in chemical reactions.

In catalysis alumina plays an important role, both as a catalyst support and as catalytically active material. As is mentioned in Kirk-Othmer, Encyclopedia of Chemical Technology, 3$^{rd}$ Ed., vol. 2, pages 230 to 232, alumina can be used as catalyst in a Claus process, for dehydration of alcohols, such as the production of olefins from alcohol, and the reverse reaction, but also for the isomerization of olefins. As interacting catalyst support alumina may play a role in hydrorefining catalysts, e.g. in cobalt or nickel-molybdenum oxides on alumina.

As a support material alumina is frequently used for precious metal catalyst production or for catalysts applied to oxidation or (de)hydrogenation reactions. For example, as support for a nickel catalyst it may be used in hydrogenation reactions such as for fat and oils hydrogenation, for hydrogenation of fatty nitriles or of nitro aromatic compounds.

The internal pore structure of the support, i.e. the BET surface area, the pore size and the pore volume distribution, forms an important aspect of the alumina or alumina-based catalyst. In view of activity and selectivity it would be highly desirable to have an alumina product that is highly porous and has a high geometric surface area, and at the same time offers a good mechanical strength and stability.

Unfortunately, these are requirements that are difficult to reconcile with each other.

In fixed bed processes shaped bodies of alumina are frequently used. An important aspect therein is the shape dependency of the pressure drop. Tablets and extrudates are the materials commonly used in fixed bed applications. In order to minimize the pressure drop, the use of star-shaped extrudates would be most suitable. However, star-shaped bodies or extrudates, show a high pressure drop when a high geometric surface area is desired.

WO 00/25918 discloses star-shaped alumina extrudates with a pore volume in pores of diameter of over 1000 nm, as determined by mercury porosimetry, of at least 0.05 ml/g. The resulting star-shaped alumina extrudates show five lobes, wherein the lobes are short and broad in order to minimize the attrition upon use.

WO 99/58480 discloses a process for the preparation of styrenes comprising the gas phase dehydration of 1-phenylethanol at elevated temperatures in the presence of a dehydration catalyst, wherein the dehydration catalyst consists of star-shaped alumina catalyst particles having a surface area (BET) in the range of from 80 to 140 m$^2$/g and a pore volume (Hg) in the range of from 0.35 to 0.654 ml/g, of which 0.03 to 0.15 ml/g is in pores having a diameter of at least 1000 nm. The catalyst particles have a length/diameter ratio in the range of from 0.5 to 3.0. It is stated that 4-, 5- or 6-cornered star shapes are preferred.

WO 2017/065970 A1 discloses a catalyst carrier with a snowflake-like geometry. The catalyst carriers show a low pressure drop while having a relatively high geometric surface area in comparison to the comparative examples.

WO 2019/055220 A1 discloses modified trilobe- and quadrolobe-shaped catalyst extrudates having a larger surface to volume ratio than previously known catalyst forms. The multilobe-shaped catalyst particles are also claimed to have a reduced pressure drop when used in a fixed bed unit, though no experimental evidence is provided.

EP 0 423 694 A1 discloses cog-wheel-type metal oxide catalyst bodies.

The object underlying the present invention is to provide improved star-shaped ceramic bodies, preferably alumina or silica bodies or extrudates for use as catalysts or catalyst supports or reactor filling materials which overcome the disadvantages of the known catalyst shapes and have an improved geometry, combining high geometric outer surface area (GSA) with low pressure drop and preferably also with high mechanical stability, specifically high side and/or bulk crushing strength, under practical conditions in a packed catalyst bed.

It is a further object of the invention to reconcile the above requirements in the form of an improved ceramic body, preferably alumina extrudate, having a carefully balanced set of properties. Further objects and advantages will become clear from the following description of the invention and the preferred embodiments thereof.

The invention is based thereon that the inventors have now been able to provide a star-shaped alumina extrudate, having an optimum GSA and pressure drop, preferably combined with a high side and/or bulk crushing strength.

Surprisingly, this set of properties can be made available in one material, thereby providing a material with which chemical reactions can be made much more efficient, resulting in higher activity and/or selectivity. Also, the material of the invention, when used in fixed bed reactors, provides a low pressure drop and a high geometric surface area, combined with high (side)crushing strength.

The objects are achieved by a star-shaped ceramic body, wherein the cross-section of the body has six lobes, the ratio of the maximum radius r2 in the star to radius r1 of a circle connecting the intersections of the lobes being in the range of from 2.17 to 3.61, the ratio of the area F1 inside this circle to the summed area F2 of the lobes outside this circle being in the range of from 0.54 to 0.90, the ratio of the distance x2 between the two intersections I of one lobe with neighboring lobes and the radius r1 of the circle being in the range of from 0.67 to 1.11).

The ceramic body can be employed as catalyst support or catalyst carrier, as catalyst itself and also as filling material for catalyst beds, e.g. as bed supports or bed toppings which are included in a catalyst bed besides the catalyst itself.

Therefore, the ceramic bodies are preferably selected from catalyst carriers or catalyst supports, catalysts and reactor filling materials.

Preferably, the ceramic body is a ceramic catalyst body.

Preferably, the ceramic body is an alumina or silica body or extrudate.

Preferably, the cross-section of the body has six axes of mirror symmetry, so that the six lobes have an identical shape.

The mirror symmetry according to the present invention allows for a slight deviation from mirror symmetry. Preferably, at most one or two lobes deviate from the six axes of mirror symmetry. Thus, one or two lobes might be of different size or slightly inclined with regard to the other lobes, while still fulfilling the above geometrical requirements for the star-shaped ceramic body.

The mirror symmetry allows for a maximum of 10% deviation from ideal mirror symmetry, more preferably of 5% or less deviation from ideal mirror symmetry. Most preferably, the cross-section of the body has six axes of mirror symmetry without deviation from mirror symmetry. The mirror symmetry can be seen in FIG. 1 and FIG. 2, where six identical lobes are depicted.

The following preferred ceramic body is a star-shaped alumina body or extrudate which is specifically advantageous for dehydration reactions.

The objects are preferably achieved by a star-shaped alumina extrudate, wherein the cross-section of the extrudate has six lobes, has six axes of mirror symmetry, the ratio of the maximum radius r2 in the star to radius r1 of a circle connecting the intersections of the lobes being in the range of from 1.0 to 3.61, preferably from 2.17 to 3.61, the ratio of the area F1 inside this circle to the summed area F2 of the lobes outside this circle being in the range of from 0.54 to 0.90, the ratio of the distance x2 between the two intersections I of one lobe with neighboring lobes and the radius r1 of the circle being in the range of from 0.67 to 1.11.

In the following, the ceramic bodies of the invention are described, partly by reference to the preferred alumina extrudates as ceramic bodies. The following description is meant to relate to ceramic bodies in general, also when the preferred alumina extrudates are described.

The ceramic body can be formed by various techniques including extrusion, additive manufacturing (like 3D printing) or tableting. Preferably, the ceramic bodies are prepared by extrusion. Therefore, in the following, the ceramic bodies are often illustrated by mentioning extrudates. These descriptions can be extended to and include the other ceramic bodies and techniques.

Star-shaped bodies or extrudates can be defined as objects having some kind of central part or core, with three or more extensions on the circumference thereof. An advantageous property of the star-shaped extrudates is the fact that the ratio of geometric surface area to volume is more advantageous than in the case of conventional cylindrical extrudates or tablets.

According to the present invention, it has been found that by employing this specific six lobe geometry of the ceramic body, preferably alumina extrudate, the geometric surface area GSA can be maximized while minimizing the pressure drop in a packed bed of the ceramic bodies, preferably extrudates, with regard to known star-shaped alumina extrudates. Specifically, the gain in GSA can be higher than the penalty in the pressure drop experienced in such packed bed. Furthermore, a high side and/or bulk crushing strength can be obtained.

The gain in geometric surface area GSA in relation to a pressure drop is specifically achieved in a packed bed, so that not only the behavior of an individual extrudate is improved, but also the behavior of a packed bed of the alumina extrudate.

The star-shaped ceramic bodies, preferably alumina or silica extrudates, according to the present invention combine an advantageous property profile including high geometric surface area GSA and low pressure drop when in a packed bed. They preferably also are mechanically stable, and preferably have a high side crushing strength, high bulk crushing strength, and low attrition.

A high geometric surface area typically leads to a high activity of the ceramic bodies, preferably alumina extrudates, when employed as a catalyst or catalyst support, in particular in chemical reactions that are mass-transfer (diffusion) limited.

According to the present invention it has been found that a six-lobe star-shaped ceramic body, preferably alumina extrudate, is superior to a five-lobe star-shaped alumina extrudate, but that the number of lobes themselves is not sufficient for a good catalyst structure showing the above advantages.

Among other parameters, the size (diameter, length) of the ceramic body or catalyst extrudate, the slope of the lobes from intersection to top, the number of lobes, the sharpness of lobes, the depth of lobes and the size of the extrudates were varied, leading to the above improved star-shaped ceramic body or alumina extrudate. The lobes can also be described as flutes or fingers of the stars.

The advantageous properties of the ceramic bodies, preferably extrudates, shall be maintained for a long time upon practical use, in which attrition of the ceramic bodies cannot be totally avoided. By employing the specific shape according to the present invention, however, a long-term stability of the properties of the ceramic bodies, preferably alumina extrudates, can be achieved.

The geometry of the star-shaped ceramic bodies, preferably alumina extrudates, of the present invention can be further illustrated with regard to FIGS. 1 and 2 showing a cross-sectional view of the body or extrudate. The die used for extrusion will have openings of this shape, taking into consideration a possible shrinking of the paste after extrusion upon drying and possible calcination.

FIGS. 1 and 2 show a six-lobe star shape, wherein the major part of the lobe outer walls is straight.

A circle connecting the intersections of the lobes, as shown in FIG. 1, has a radius r1, whereas the maximum radius extends from the center of the cross-section to the maximum radius, i.e. the farthest end of the lobes, denoted r2. The ratio of the maximum radius r2 in the star to radius r1 of the circle connecting the intersections of the lobes is in the range of from 1.0 to 3.61, preferably from 2.17 to 3.61, more preferably from 2.60 to 3.18, most preferably from 2.75 to 3.03, for example 2.89.

The ratio x2 to r1 is 0.67 to 1.11, preferably 0.80 to 0.98, more preferably 0.85 to 0.93, for example 0.66.

The ratio of the area F1 inside this circle to the summed area F2 of the lobes outside the circle is in the range of from 0.54 to 0.90, preferably from 0.65 to 0.79, most preferably from 0.68 to 0.76, for example 0.72.

FIG. 1 also shows a radius r3 which extends to the endpoints of the straight part of the lobes, starting at the center of the cross-section and ending at the middle point of a straight line connecting the two endpoints of the straight sides of one lobe.

The ratio r2 to r3 is preferably from 0.80 to 1.33, more preferably from 0.95 to 1.17, most preferably from 1.01 to 1.11, for example 1.06.

Preferably, each lobe has straight outer walls and a rounded top. Preferably, each lobe has straight outer walls with a rounded top, wherein the ratio of the length x1 from the intersection I of one lobe with neighboring lobes to the end of the straight walls to the distance x2 between two intersections I of one lobe with neighboring lobes is from 0.87 to 1.45, more preferably 1.04 to 1.28, most preferably 1.10 to 1.22, for example 1.16. The respective distances are shown in FIG. 2.

Preferably, each lobe has straight outer walls with a rounded top, wherein the angle α between the straight wall and the straight line x2 between two intersections I of one lobe with neighboring lobes is from 70 to 140 degrees, preferably from 92 to 102 degrees, more preferably 94 to 100 degrees, most preferably 96 to 98 degrees, for example 97 degrees. This angle is also shown in FIG. 2.

Preferably, the ratio of the length x2 between two intersections I of one lobe with neighboring lobes to the length x3 between the ends of the straight walls is from 0.9 to 1.8, preferably from 1.01 to 1.69, more preferably 1.22 to 1.49, most preferably 1.28 to 1.42, for example 1.35. The respective lengths x2 and x3 as well as the intersections I are shown in FIG. 2.

Preferably, each lobe has straight outer walls with a rounded top, and the ratio of the lobe area of the trapeze confined by the straight walls of a lobe and the outer-lobe area outside this trapeze is from 2.5 to 14.35, preferably from 9.36 to 14.25, more preferably 10.33 to 12.63, most preferably 10.90 to 12.05, for example 11.48. The trapeze area F3 and the outer lobe area F4 are shown in FIG. 2.

The rounded top has a radius of preferably 0.23 to 0.38 mm, more preferably 0.27 to 0.33 mm, most preferably 0.29 to 0.32 mm, for example 0.30 mm.

Preferably, the cross-section area of the extrudate is from 0.19 to 13.9 $mm^2$, preferably from 1 to 7 $mm^2$, preferred from 2.39 to 3.98 $mm^2$, more preferably 2.86 to 3.50 $mm^2$, most preferably 3.02 to 3.34 $mm^2$, for example 3.18 $mm^2$.

Preferably, the maximum radius r2 is from 0.4 to 6 mm, preferably from 0.9 to 6 mm, preferred from 1.35 to 2.25 mm, more preferably 1.62 to 1.98 mm, most preferably 1.71 to 1.89 mm, for example 1.80 mm. Alternatively, r2 can preferably be 1.2 to 1.5 mm.

Preferably, the circle radius r1 is from 0.25 to 3.4 mm, preferably from 0.49 to 0.81 mm, more preferably 0.59 to 0.72 mm, most preferably 0.62 to 0.68 mm, for example 0.88 mm. The circle area F1 can be calculated therefrom.

As indicated above, the use of star-shaped extrudates is important in terms of pressure drop in relation to accessibility of the external surface of the alumina. This also plays an important role in eliminating diffusion problems.

The ratio of the length L of the extrudates to the maximum diameter 2 r2 is preferably from 1 to 3, more preferably from 1 to 2, most preferably from 1 to 1.5, whereby as length L the distance is meant between two parallel planes on either side of the extrudate, thus the cutting planes during extrusion. According to one embodiment of the invention, the length is adjusted by cutting the extrudates, e.g. by a (rotating) knife. Preferably, at least 80%, more preferably at least 90%, most preferably at least 95% of the extrudates lie within a range of +/−10% of the medium length, determined by measuring the length of 100 specimen.

Preferred aspects of the ceramic body of the invention are also the strength characteristics including high side crushing strength and bulk crushing strength. These parameters can be important for the suitability of the ceramic bodies for use in large scale reactors, e.g. in huge fixed bed reactors like in the petroleum industry.

Strength should always be compared for bodies having a comparable GSA, and so strength should refer to a diameter of the particle.

FIG. 4 shows the GSA as a function of particle diameter. For 2.4 mm particle diameter, the side crushing strength can be preferably at least 25 N, more preferably at least 40 N, the bulk crushing strength can preferably be at least 0.3 MPa, more preferably ate least 0.4 MPa.

The side crushing strength and the bulk crushing strength is defined as follows:

The side crushing strength (SCS) of extrudates is defined as the pressure (in newtons) at which extrudates of 4.5 to 5.0 mm length are crushed, when treated under pressure between two flat plates on a AIKOH, 9500 series tester. It can also be simulated or modelled by filling a (virtual) geometry between two plates with spheres, applying an increasing force on the top plate and observing a movement of the plate which indicate a breaking in the agglomerate of spheres.

The bulk crushing strength (BCS) of a catalyst is defined as the pressure (in megapascals) at which 0.5% fines (i.e. particles less than 0.425 mm) are formed when treated under a piston in a tube. For that purpose, 17 ml of catalyst particles, presieved on a 0.425 mm sieve, are loaded in a cylindrical sample tube (diameter 27.3 mm), and 8 ml steel beads are loaded on top. The catalyst is subsequently treated at different (increasing) pressures for three minutes, after which the fines are recovered and their percentages are determined. This procedure is repeated until a level of 0.5 wt % fines is reached.

Preferably, the ceramic bodies or extrudates show a high side and/or bulk crushing strength.

Another aspect of the strength of the material is the attrition, i.e. the amount of material that may break off of the extrudates upon use. This attrition, determined in accordance with ASTM D4058-87, valid in 2019, should preferably be less than 5 wt %, more in particular less than 4 wt %.

Preferably, the ceramic bodies or extrudates have a low attrition.

The ceramic bodies according to the present invention are prepared from ceramic materials. The ceramic materials include clay minerals, carbides, nitrides, oxides, silicides of metals, as well as zeolites. Typical ceramic materials can be based on alumina, silica, titania, zirconia, and mixtures and hydroxides thereof. Starting materials for ceramic materials can be these oxides or mixed oxides, e.g. kaolinite or illite, or hydroxide or oxyhydroxide precursors.

The ceramic material can be freely chosen from the known ceramic materials. Preferably, the ceramic bodies are alumina or silica bodies or extrudates. The following description of the alumina extrudates and their preparation can also be applied to other ceramic materials.

Furthermore, the preparation process can be different from extrusion and can cover also tableting or additive manufacturing techniques, like 3D printing.

The ceramic body can be a ceramic catalyst body which is the catalyst itself. The ceramic body can also be converted to the catalyst by serving as a support material. Furthermore, the ceramic body can be inert and serve auxiliary functions, such as being used as a reactor filling material.

The ceramic catalyst body may be prepared from a catalytic material or may be prepared from a catalyst support material in a first step and coated with a catalytic material in a second step or may be prepared from an inert material.

More than one catalytic material may be applied to prepare the ceramic catalyst body.

If desired, a ceramic catalyst body prepared from a catalytic material may be further coated with the same or a different catalytic material.

In one embodiment, the catalytic material comprises a metal or metal compound.

Preferably, the catalytic material comprises one or more metals or metal compounds selected from the group consisting of Li, Na, K, Rb, Cs, Mg, Ca, Sr, Ba, Al, Ga, Si, Sn, Pb, P, Sb, Bi, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, lanthanide metals or actinide metals.

Suitable metal compounds are oxides, peroxides, superoxides, hyperoxides, nitrides, carbides, sulfides, nitrates, (poly)phosphates, sulfates, (poly)tungstates, (poly)molybdates, aluminates, alumino-silicates, titanates, halogenides, hydroxides, carbonates, hydroxycarbonates, metal organic compounds, metal chelates, or mixtures thereof.

Metal oxides may comprise a single or mixed metal oxide such as a spinel or perovskite, or a composition comprising two or more metal oxides.

In one embodiment, the catalytic material comprises a zeolite.

In one embodiment, the catalytic material comprises a clay.

In an alternative embodiment, the ceramic catalyst body is prepared first from a catalyst support material and the method comprises applying a catalytic material to said ceramic catalyst body. The catalyst support material may comprise one or more support materials such as alumina, silica, titania, zirconia, silicon nitride, silicon carbide, zeolites, clays and mixtures thereof. Ceramics such as cordierite may also be used.

If the catalytic material is a metal, preferably the catalytic material comprises a precious metal catalyst, e. g. comprising one or more of Pt, Pd, Ir, Ru, Os, Re, Rh, Au, Ag optionally mixed with one or more additional metals and/or metal compounds and/or catalyst support materials.

The catalytic material may be applied to the ceramic catalyst body made from the catalyst support material from a solution or dispersion. Particularly suitable metal compounds for application from solution are water-soluble salts such as metal nitrates, metal acetates, formates, or oxalates.

Catalytic metals may also be applied to the catalyst support material by metal vapor deposition.

In an alternative embodiment, the ceramic body may also be prepared from an inert material, which is useful for application in catalysis, for example if the function of the ceramic body is auxiliary to the actual catalyst in a catalyst bed, e. g. for the purpose of flow distribution, heat dissipation, guard beds, bed supports and bed toppings.

Preferably, the ceramic body is an alumina extrudate.

The alumina extrudates having the above properties can be prepared by mixing hydroxide or oxyhydroxide precursors, optionally in the presence of a binder, in the presence of a liquid, usually water or an aqueous solution of an acid, such as nitric acid, formic acid or acetic acid, to form a paste, followed by extrusion of the paste in the required star form, using a suitable die, and optionally cutting the extruded strands of material to the required length. Optionally after drying, the extrudates are calcined.

It is possible to use various types of binder materials, such as those based on silica or alumina. Examples are colloidal silica, water glass, or clays. It is preferred to use an alumina-based binder or a binder that is removed during calcination, while providing and maintaining the required strength. An example of a suitable binder system is an alumina binder that gels under acidic treatment, for example by using organic or inorganic acids. The amount of binder material used in the preparation of the paste that is to be extruded will vary depending on the type of material and the required strength. Generally, it will not be in excess of 30 wt %, based on the dry weight of binder and ceramic material, for example alumina, together.

The term "alumina" as used in connection with the present invention refers to an inorganic oxide consisting for at least 90 wt %, preferably at least 95 wt % and most preferably at least 99 wt %, of $Al_2O_3$. The remainder up to 100 wt % may consist of minor amounts of other inorganic oxides such as silica and alkali metal oxides. Preferably, no such other inorganic oxides are present and an inorganic oxide consisting of essentially 100 wt % of alumina is used. Suitable aluminas include alpha-alumina, gamma-alumina, delta-alumina, eta-alumina, theta-alumina, chi-alumina and kappa-alumina. Suitable alumina raw materials include alumina monohydrate (boehmite), alumina trihydrate (gibbsite, bayerite), transition alumina, or mixtures of the above.

According to one embodiment of the invention, the aluminium oxide (alumina) has one or more of the following properties:

selected from alpha-, gamma-, delta-, theta-, chi-, kappa-, rho- or eta-alumina, or mixtures thereof;

BET surface area in the range of from 0.5 to 350 $m^2/g$;

pore volume in the range of from 0.05 to 2.0 ml/g;

a monomodal or polymodal pore size distribution;

use of a dopant.

Preferred aluminas are described in the following:

Alpha-alumina has a low surface area and can be typically only employed as a catalyst support or reactor filling material, but not as catalytically active material itself. Due to the high-temperature treatment of above 1000° C., for example 1150° C. and above applied in the synthesis of alpha-alumina, most of the functional groups, acidic and basic in nature, will be lost.

Transition alumina crystal phases such as gamma-, delta-, theta-, chi-, kappa-, rho- or eta-alumina, or mixtures thereof can be obtained at intermediate temperatures between 500° C. and 1000° C. Functional groups are found in transition alumina catalysts and are at the origin of their catalytic activity. The surface chemistry of transition alumina catalysts is highly complex and involves Bronsted and Lewis acidity and basicity.

Aluminum oxide can occur in various crystallographic phases and commercial catalyst systems may consist of a single crystallographic phase or mixtures of two or more crystallographic phases.

Commercial catalyst systems are most often derived from transition alumina phases but not from alpha-alumina. Alpha alumina may be for example applied as a catalyst support material or as a reactor filling material.

Suitable transition alumina modifications are gamma-, delta-, theta-, chi-, kappa-, rho- or eta-alumina or mixtures thereof.

The exact crystalline nature of the transition alumina catalyst will be determined by both the initial crystalline properties of the hydroxide or oxyhydroxide precursors and the thermal process and calcination temperature to which the catalyst is subjected during its manufacture.

Calcining temperatures are typically between 500° C. and 1000° C. for transition alumina crystal phases. This process results in the loss of physically and chemically bound water.

Optionally, steam may be applied during the calcination step to further modify the properties of the transition alumina catalyst.

The following scheme shows the formation of transition alumina phases and alpha-alumina:

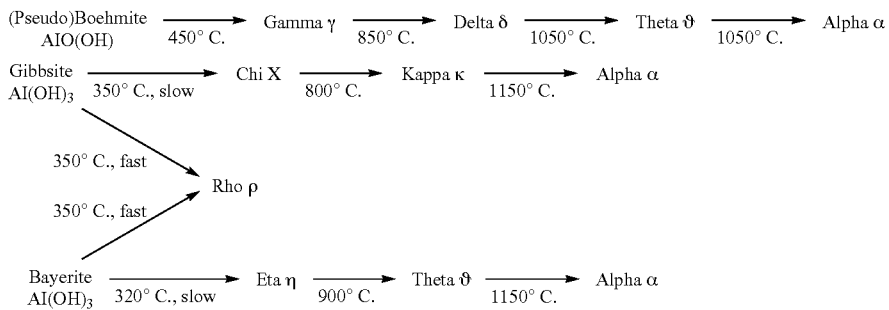

Hydroxide precursors suitable for the synthesis of transition alumina catalysts comprise gibbsite, bayerite, nordstrandite and doyleite.

Oxyhydroxide precursors suitable for the synthesis of transition alumina catalysts comprise diaspore, boehmite, pseudoboehmite and akdalaite or tohdite.

Although the common transition aluminas are often derived from hydroxide or oxyhydroxide precursors obtained from the Bayer process and find many catalytic applications, high-purity precursor materials (e. g. pseudoboehmite from the Ziegler process, for linear alcohol production) are sometimes preferred.

For the synthesis of transition alumina catalysts also mixtures of different hydroxide precursors, mixtures of different oxyhydroxide precursors or mixtures of hydroxide and oxyhydroxide precursors may be applied.

To modify the surface properties, acidity and alkalinity of transition alumina catalysts ("doping") other element precursors may be included on purpose in a range of 0.1 wt % to 10.0 wt %, based on their content in the final transition alumina.

If intended, minor amounts of dopants or mixtures of dopants, e. g. selected from chemical compounds of Li, Na, K, Ca, Mg, Ba, B, Ga, Si, Ti, Zr, Fe, W, P or Zn can be present in the alumina in a maximum amount of 10 wt %, based on the amount of alumina or hydroxide precursor particles or oxyhydroxide precursor particles of transition alumina particles or mixtures thereof, for example 0.1 to 10 wt %, preferably 1.0 to 5.0 wt %, based on the particles forming the transition alumina. According to one embodiment of the alumina, no dopants are employed or added to the alumina.

The alumina or the precursors thereof may also contain minor amounts of impurities which may qualify as dopants. In such cases, typical impurities are $Li_2O$, $Na_2O$, $K_2O$, $CaO$, $MgO$, $BaO$, $B_2O_3$ $Ga_2O_3$, $SiO_2$, $TiO_2$, $ZrO_2$, $ZnO$, $Fe_2O_3$ as well as chlorides, nitrates and sulfates. If doping is not intended, these amounts should be as low as possible. Typically for such cases, in the final transition alumina, preferably eta-, gamma-, or delta-alumina, the amount of such impurities is not higher than 5%, more preferably not higher than 2.5%, specifically not higher than 0.5 wt %, based on the alumina.

Preferably, the high purity (transition) alumina has maximum impurity level of Na, determined by AES, of 7500 ppm, more preferably 5000 ppm, most preferably 3000 ppm. Impurities from Si, Ti, Fe, determined by XRF, preferably are not more than 10000 ppm, more preferably not more than 7500 ppm, most preferably not more than 5000 ppm in total.

Thus, the ceramic body or catalyst according to one embodiment of the invention does not contain additional catalytically active components like catalytically active metals in the final ceramic body or catalyst.

The ceramic body or catalyst of the invention is preferably a transition alumina (i.e. non-alpha alumina) catalyst, but also alpha alumina may be used, in particular for catalyst support and reactor filling applications. Transition alumina is different from alpha-alumina and includes gamma-, delta-, theta-, chi-, kappa-, rho- or eta-phases as shown above.

One can distinguish catalyst supports for "high grade" applications (e.g. fine chemical catalysis, precious metal systems supported on alumina) from "lower grade" applications, e.g. where alumina's are used in purification applications typically prepared at significantly larger volumes.

The alumina bodies or catalysts preferably have the following properties:

The BET surface area, as determined by single point adsorption using the BET equation (as e.g. described by G. Sandstede et. al., Chem. Ing. Tech., vol. 32, issue 6 (1960), 413) can be at least 10 $m^2$/g of alumina for transition aluminas including gamma-, delta-, theta-, chi-, kappa-, rho- or eta-alumina, and lower for alpha-alumina. The transition aluminas have a large BET-surface area, generally in the range of 10 $m^2$/g up to more than 350 $m^2$/g.

The preferred alumina body or catalyst of the present invention preferably has a surface area in the range of from 0.5 to 350 $m^2$/g, more preferably in the range of from 10 to 200 $m^2$/g. Still more preferably, the surface area of the catalyst is in the range of from 60 to 170 $m^2$/g. The surface area is determined according to the well-known Brunauer-Emmett-Teller (BET) method.

Preferably, the total pore volume of the alumina body or catalyst is of from 0.05 to 2.0 ml/g, more preferably 0.2 to 1.5 ml/g. Still more preferably, the total pore volume is greater than 0.4 ml/g and can be in the range of from 0.5 to 0.75 ml/g. The total pore volume is determined according to the well-known mercury porosimetry method.

The alumina body or catalyst according to the present invention can have a monomodal or a multimodal pore size distribution. A multimodal pore size distribution means a pore size distribution in which, when incremental pore volume is plotted as a function of pore size, the resulting function exhibits a maximum (or mode) within a first pore size range and a maximum (or mode) within a second pore size range. In general, a maximum (or mode) is the most frequently occurring number within a specific range of numbers. In relation to pore size distribution, the pore size maximum (or mode) is the pore size which, within a specific pore size range or within a subrange falling within such range, corresponds to the highest peak in a graph showing the pore size distribution. Therefore, in accordance with this specification, a multimodal pore size distribution means that within said first pore size range there should be at least one peak in a graph showing the pore size distribution, and within said second pore size range there should also be at least one peak in a graph showing the pore size distribution. Examples of multimodal pore size distributions having two peaks are shown in FIGS. 2 and 3 of EP 2 231 559 B1. The pore size may be the pore diameter or the pore radius.

Preferably, in the multimodal pore size distribution, the pore size range comprises a first pore size range and a second pore size range and the pore sizes in the first pore size range are smaller than the pore sizes in the second pore size range.

Preferably, a first pore size range is a pore diameter range of from 2 to 100 nm (mesopores) and a second pore size range is a pore diameter range of greater than 100 nm, for example greater than 100 nm to smaller than 10000 or 1000 nm (macropores). Preferably, the maximum (or mode) in the first pore size range is at a pore diameter of from 5 to 30 nm, more preferably of from 10 to 20 nm. Further, preferably, the maximum (or mode) in the second pore size range is at a pore diameter of from 300 to 1000 nm, more preferably from 400 to 700 nm.

Preferably, the pore diameters corresponding to the maximums (or modes) in first and second pore size ranges are separated by at least 200 nm, more preferably at least 300 nm, and by at most 1000 nm, more preferably at most 750 nm.

The median pore diameter calculated by volume ($MPD_V$) may preferably be from 5 to 50 nm, more preferably from 10 to 40 nm and most preferably from 15 to 30 nm. $MPD_V$ herein means the pore diameter above which half of the total pore volume exists. Preferably, the $MPD_V$ is greater than the pore diameter mode in a first pore size range and smaller than the pore diameter mode in a second pore size range.

The pore size distribution is determined according to the well-known mercury porosimetry method.

The pore volume is a further important requirement, whereby it is on the one hand important that the total pore volume, as determined by mercury intrusion, is sufficiently high and on the other hand that the pore volume in pores of over 1000 nm forms a substantial portion of the total pore volume. In absolute terms the total pore volume should be at least 0.40 ml/g, whereas the ratio of the pore volume in pores of over 1000 nm to total pore volume should preferably be more than 0.04. An alumina having those properties has good properties in terms of reactant accessibility, which makes it very suitable for all kinds of catalytic reactions requiring good diffusion of reactants and products through the alumina, thereby eliminating diffusion limitation problems as much as possible.

The pore volume and pore size distribution are determined by mercury porosimetry measurements, as described by J. Rouquerol et al. in Pure Appl. Chem., vol. 66, no. 8, 1994, pages 1752 to 1753, using the Washburn equation.

Preferably, the alumina body or catalyst according to the present invention has from 10 to 40%, more preferably from 20 to 35%, and most preferably from 25 to 30%, of the total pore volume in pores having a diameter greater than 100 nm (macropores). Further, preferably the catalyst has from 60 to 90%, more preferably from 65 to 80%, and most preferably from 70 to 75%, of the total pore volume in pores having a diameter from 2 to 100 nm (mesopores). Still further, preferably the catalyst has less than 3%, more preferably less than 2% and even more preferably less than 1%, of the total pore volume in pores having a diameter greater than 1000 nm. Most preferably, the catalyst has essentially no pore volume in pores having a diameter greater than 1000 nm.

The maximum diameter 2 r2 of the catalyst particles is not particularly critical to the present invention. Diameters normally used for this kind of catalysts may be employed. The term "diameter" as used in this connection refers to the largest distance between two opposite points on the perimeter of the cross-section of a catalyst particle. In case of rod-like particles having a shaped cross-section, this shaped cross-section is the relevant cross-section. It has been found particularly advantageous for the purpose of the present invention to use catalyst particles having a diameter of from 1.5 to 10 mm, preferably of from 2.5 to 7.5 mm, most preferably 3.0 to 4.5 mm, specifically 3.57 to 3.95 mm, for example 3.76 mm.

As outlined above, preferably a shaped catalyst is used. The expression "shaped catalyst" refers to a catalyst having a certain geometry. Suitably shaped catalyst particles can be obtained by a method involving extrusion and calcination, wherein the geometric features of the particles are set by using an extruder having a die plate with an orifice of the desired shape. Generally, such shaping process comprises mixing one or more alumina raw materials with water and optionally an acid solution to form an extrudable paste, passing the paste through said orifices, optionally cutting the extrudate to the desired length, and drying and calcining the formed catalyst particles. Cutting the extrudate leads to a narrower length distribution (e.g. +/−1 mm), compared to random breaking of the extrudate (e.g. +/−3 mm). In a typical length distribution for a cut extrudate (4 mm stars), most of the particles are centered +/−1 mm around the medium length. In a standard extrudate (3.2 mm cylinders), for which length distribution is a result of random breakage during production, the size distribution curve is much broader, with the particles sitting in a +/−3 mm range around the maximum.

Reference can be made to PCT/EP2019/063815 for suitable materials.

The extrudates or catalysts according to the present invention are used in a chemical reaction, preferably in oxidation reactions, hydrogenation reactions, dehydrogenation reactions and more preferably in dehydration reactions. Dehydration reactions are reactions that release water as a reaction product.

The invention furthermore relates to the use of these ceramic bodies as catalysts in these reactions. Preferably, the reactions involve a gas phase, a liquid phase or mixed liquid/gas phase.

In some embodiments, the use of these ceramic bodies as catalysts involves the dehydration of an aliphatic or benzyl alcohol to form an ether or an olefin.

The term "dehydration" encompasses all chemical reactions, in which water is liberated from a chemical compound while forming a covalent bond. Preferably, alcohols or ethers are dehydrated, for example methanol, ethanol, n-propanol, iso-propanol, n-butanol, iso-butanol, tert-butanol, pentanol, hexanol, 1-phenylethanol, 2-phenylethanol, cumyl alcohol (2-phenyl-2-propanol) or glycerol.

In some further embodiments the use of these ceramic bodies as catalysts involves the isomerization of double bonds, cis/trans isomerization and skeletal isomerization reactions.

These reactions are described for example in Ullmann's Encyclopedia of Industrial Chemistry, 2012, in the section "Aluminum Oxide".

For the conversion of 1-phenylethanol and 2-phenylethanol into styrene, reference can be made to WO 2009/074461 and WO 2004/076389.

According to the present invention, it has been found that the pressure drop and geometric surface area GSA are not always in linear correlation, making it impossible to find an optimum by shape by routine optimization strategies.

The concept according to the present invention allows for low acceptable pressure drop and the desired high GSA.

According to the present invention, the gain in surface area exceeds the penalty in pressure drop, showing a specifically advantageous behavior in a packed bed structure.

The invention will now be elucidated on the basis of an example.

EXAMPLE 1

1.5 kg of aluminium trihydrate is mixed with 0.336 kg of alumina binder and 0.0237 kg of nitric acid (67%) and 0.383 kg of water.

If required, a small amount of organic lubricant may be applied to the mix and the mixing is continued until a relatively dry product is obtained, the intermediate product is extruded using an extruder, equipped with a die having star-shaped orifices, as shown in FIGS. 1 and 2, and a cutting device.

The die has the following properties:
r1: 0,62 mm
r2: 1.8 mm
r3: 1.66 mm
r4: 0.29 mm
α: 97°
x1: 0.93 mm
x2: 0.79 mm
x3: 0.60 mm
Cross section area: 6.16 mm$^2$
x2/ x3: 1.27
x1/ x2: 1.18
x2/ r1: 1,27
r2/ r1: 2.90

The extrudates obtained are dried at 105° C. for 16 hours and subsequently calcined at 850 to 900° C. for one hour.

After drying and calcining, r2 can be 1.7 mm due to shrinking; the other parameters may change accordingly.

The final product has been analyzed for its physical properties with the following result:
$N_2$-BET surface area: 106 m$^2$/g
Total Hg pore volume: 0.45 ml/g
Pore volume in pores over 1000 nm: 0.07 ml/g
Side crushing strength (SCS): 75 to 83 N
Bulk crushing strength (BSC): 0.66 to 0.85 MPa The crushing strength values will change as a function of particle diameter (which is two times r2) and as illustrated below.

SCS and BCS are strongly dependent on diameter and also on calcination procedure:
Diameter of 3.6 mm: SCS=75 to 83 N, BCS=0.66 to 0.85 MPa;
Diameter of 3.4 mm: SCS=80 to 87 N, BCS=0.6 to 0.85 MPa;
Diameter of 3.2 mm: SCS=75 to 82 N, BCS=0.51 to 0.54 MPa;
Diameter of 3.0 mm: SCS=62 to 69 N, BCS=0.48 to 0.65 MPa;
Diameter of 2.8 mm: SCS=52 to 55 N, BCS=0.45 to 0.63 MPa;
Diameter of 2.6 mm: SCS=49 to 56 N, BCS=0.45 to 0.50 MPa;
Diameter of 2.4 mm: SCS=56 to 61 N, BCS=0.43 to 0.54 MPa.

In a broad understanding of the present invention, the above values and ratios can be varied in a range of ±25%, preferably ±20%, more preferably ±15%, most preferably ±10%, in particular ±5% for all extrudates described herein.

FIG. 1 and FIG. 2 show the cross-section of the extrudate with the above parameter.

The geometric surface area (GSA) and pressure drop for a packed bed of the extrudates of different sizes were determined. The values are obtained from a detailed numerical simulation. First, a random packing is generated with a simulation using the real geometry of a reactor tube and the catalyst. The packing is generated by virtually dropping the catalyst particles into the tube and calculating the movement and impacts between particle-particle and particle-wall contacts according to Newton's second law of motion. A discrete element soft-sphere algorithm is used as numerical method. The pressure drop is the result of a detailed simulation applying computational fluid dynamics. The fluid volume is extracted from the numerically generated random packed bed. The fluid dynamics around each pellet as well as all interstitial flow phenomena are fully resolved. The pressure drop is then calculated for a bed height of 4500 mm and an inner tube diameter of 56.2 mm. Compressed air is used as fluid. The pressure at the end of the packed bed is ambient pressure. Temperature is set to ambient temperature. The applied flow rate is 1.5 Nm$^3$/h.

The extrudates according to the present example (239) were compared to a five-star extrudate as a reference and a modified trilobe extrudate (318) as a reference. All extrudates had a length of 4 mm.

Whereas all shapes show a comparable trend for the scaling of pressure drop (dp) versus geometric surface area (GSA), the 6-star geometry according to the present invention (239) has a lower onset value and is therefore beneficial.

Figure 1:
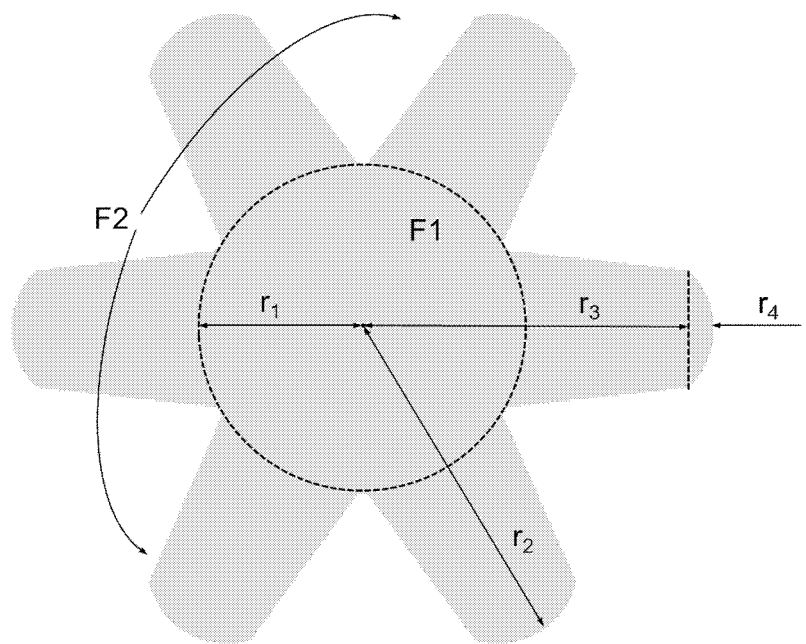
Figure 2:
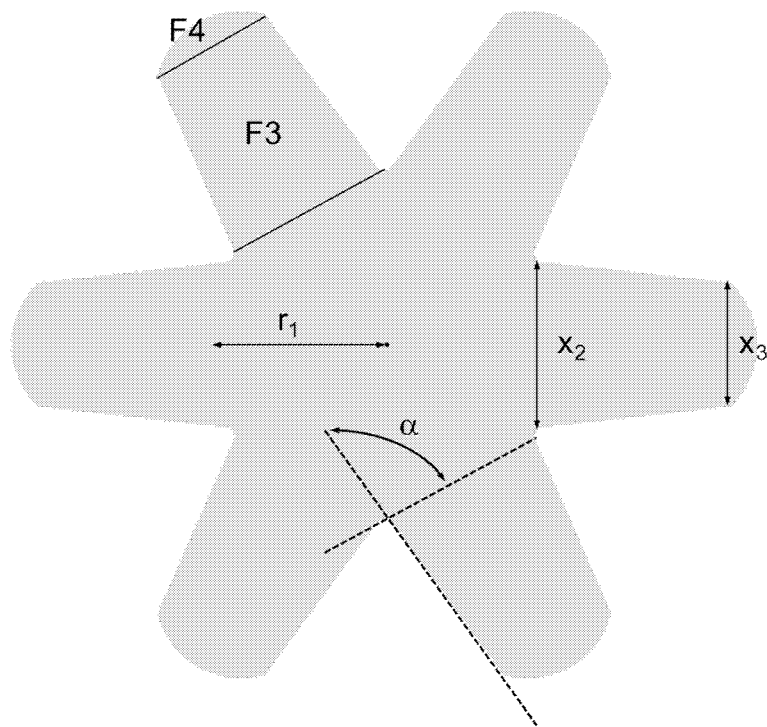
Figure 3:
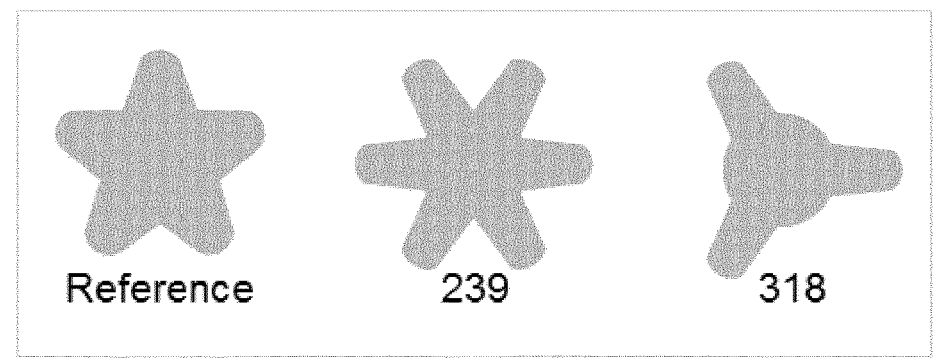
FIG. 3 shows the cross section of the reference, the six-lobe star according to the present invention (239) and a trilobe (318).
Figure 4:
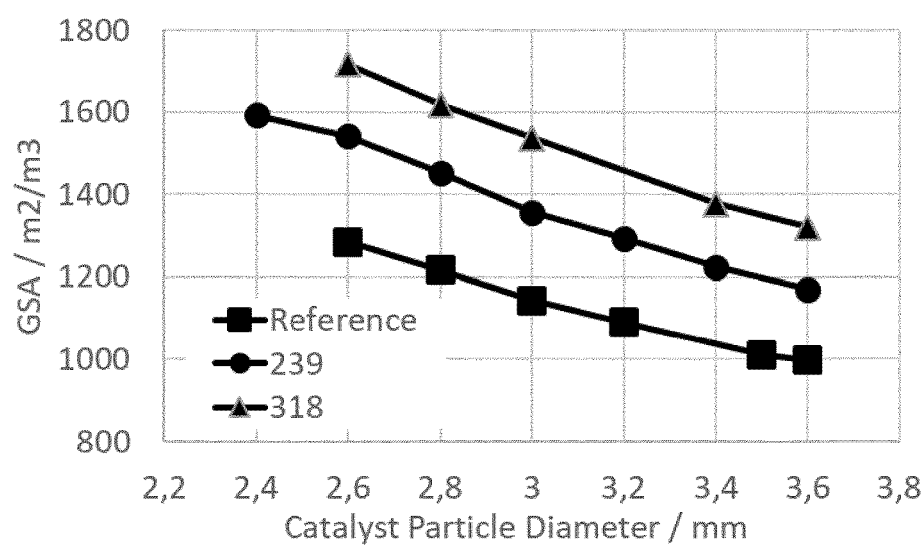
FIG. 4 shows the scaling of the geometric surface area (GSA) as a function of the catalyst particle diameter.
Figure 5:
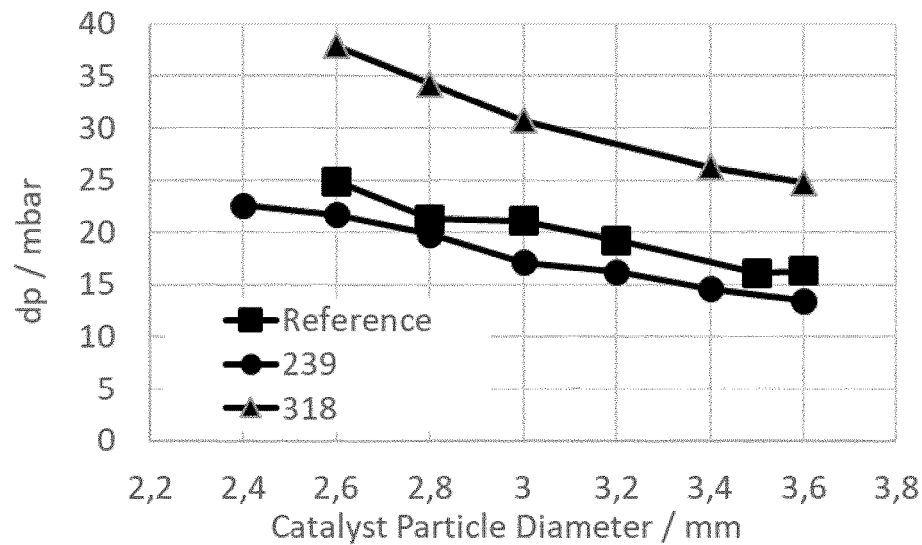
FIG. 5 shows the scaling of the pressure drop (dp) for different catalyst particle diameters.
Figure 6:
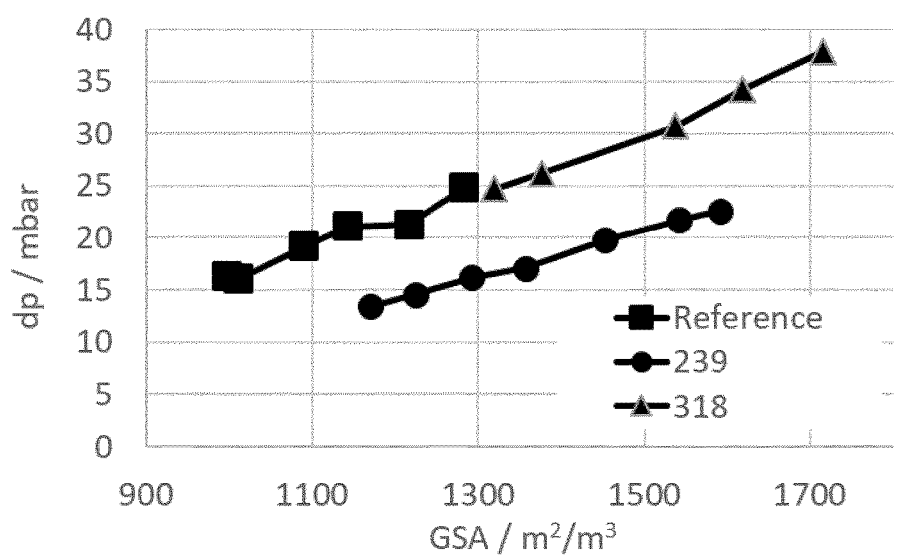
FIG. 6 shows the scaling of the pressure drop (dp) as a function of the geometric surface area (GSA).

EXAMPLE 2—ALCOHOL DEHYDRATION EXPERIMENTS 1200 grams of boehmite is mixed with 972 grams of water. The mixing is continued until a relatively dry product is obtained and the intermediate product is then extruded using an extruder, equipped with a die having star-shaped orifices, as shown in FIGS. 1 and 2.

For alcohol dehydration testing (ethanol used), 25 cc of catalyst was loaded into a 1" OD (0.834" ID)×4 ft stainless steel fixed bed downflow reactor. The reactor was equipped with a thermowell that housed five thermocouples.

The reactor was heated by a furnace, with the catalyst loaded such that its location was in the middle furnace section.

Catalyst mass loading was determined by multiplying catalyst bulk density by 25 cc.

In all cases, ⅛" Denstone spheres were used as bed support and in the pre-heat zone above the catalyst bed to provide surface area for the feedstock to vaporize.

Once loaded, the reactor was purged with 300 sccm $N_2$ for approximately 30 minutes to remove air and subsequently heated to 400° C. under flowing $N_2$ and held for at least 4 hours.

Once pretreatment of the catalyst was completed, the reactor was cooled to 375° C. and pressurized to 118 psig. Once pressure and temperature were stable, $N_2$ flow was stopped and feed consisting of 90 wt % ethanol/10 wt % water was introduced to the reactor at a rate of LHSV$_{EtOH}$=1.926 hr-1, where LHSV$_{EtOH}$ is defined as volumetric flow rate of ethanol per catalyst volume. The reactor was held at these conditions for approximately 24 hours.

Product analysis was performed with an online gas chromatograph equipped with a flame ionization detector (FID), a heated sample injection valve, and an HP-PLOT Q capillary column (30 m×0.320 mm×20·μm). The reaction effluent was delivered to the GC through heated sample lines at 180 to 200° C. and injected approximately every 15 min.

The following quantities were calculated and used to assess and compare catalyst performance: percent ethanol conversion and percent selectivity to ethylene.

Percent conversion is defined as [(molar flow rate of ethanol in−molar flow rate of ethanol out)/(molar flow rate of ethanol in)]×100.

Percent selectivity is defined as [moles ethylene produced/moles ethanol consumed]×100.

Despite lower loaded catalyst mass in the reactor, samples of shape 239 performed notably better as compared to the reference and displayed higher conversion and selectivity levels. This is especially visible at lower reaction temperatures.

TABLE 1

|  | five-star extrudate (reference) | Shape 239 | Shape 239 |
|---|---|---|---|
| diameter | 3.5 mm | 3.6 mm | 2.4 mm |
| packed density | 0.542 g/cm³ | 0.488 g/cm³ | 0.46 g/cm³ |
| loaded | 13.55 g | 12.2 g | 11.5 g |
| Conversion (400° C.) | 99.83% | 99.86% | 99.85% |
| Selectivity (400° C.) | 97.19% | 97.26% | 97.35% |
| Conversion (375° C.) | 97.03% | 98.62% | 99.86% |
| Selectivity (375° C.) | 96.53% | 97.20% | 97.26% |

EXAMPLE 3–COMPUTER TOMOGRAPHY

The measurement of the geometric surface area per reactor volume of the catalyst of the individual shapes was carried out on a GE Phoenix nanotom m CT instrument with a Voxel size of 36,667 um, a voltage of 150 uV, a current of 80 uA and 1500 pictures in 360°. The geometric surface area was determined through a post processing of the data using VGSTUDIO MAX software from Volume Graphics.

TABLE 2

|  | five-star extrudate (reference) | Shape 239 |
|---|---|---|
| Diameter, mm | 3.5 | 2.4 |
| Geometric surface area per mass, m²/kg | 1.64 | 3.59 |

TABLE 2-continued

|  | five-star extrudate (reference) | Shape 239 |
|---|---|---|
| Geometric surface area per reactor volume, m²/L | 1.46 | 2.55 |

The invention claimed is:

1. Star-shaped ceramic body, wherein the cross-section of the body has six lobes, the ratio of the maximum radius r2 in the star to radius r1 of a circle connecting the intersections of the lobes being in the range from 2.17 to 3.61, the ratio of the area F1 inside this circle to the summed area F2 of the lobes outside this circle being in the range of from 0.54 to 0.90, the ratio of the distance x2 between the two intersections I of one lobe with neighboring lobes and the radius r1 of the circle being in the range of from 0.67 to 1.11.

2. The body according to claim 1, wherein each lobe has straight outer walls with a rounded top, wherein the ratio of the length x1 from the intersection I of one lobe and neighboring lobes to the end of the straight outer wall to the distance x2 between two intersections I of one lobe and neighboring lobes is from 0.87 to 1.45.

3. The body according to claim 1, wherein each lobe has straight outer walls with a rounded top, wherein the angle a between the straight outer wall and the straight line x2 between two intersections I of one lobe and neighboring lobes is from 70 to 140 degrees.

4. The body according to claim 1, wherein each lobe has straight outer walls with a rounded top, wherein the ratio of the length x2 between two intersections I of one lobe and neighboring lobes to the length x3 between the ends of the straight outer walls is from 0.9 to 1.8.

5. The body according to claim 1, wherein each lobe has straight outer walls with a rounded top and the ratio of the lobe area of the trapeze F3 confined by the straight outer walls of a lobe and the outer lobe area F4 outside this trapeze is from 2.5 to 14.35.

6. The body according to claim 1, wherein the cross-section area is from 0.19 to 13.9 mm².

7. The body according to claim 1, wherein the maximum radius r2 is from 0.4 to 6 mm.

8. The body according to claim 1, wherein the circle radius r1 is from 0.25 to 3.4 mm.

9. The body according to claim 1, wherein the ceramic body is an alumina body.

10. The body according to claim 9, having a pore volume in pores of diameter of over 1000 nm, as determined by mercury porosimetry, of at least 0.05 ml/g.

11. The body according to claim 9, wherein the total pore volume, as determined by mercury porosimetry, is between 0.05 and 2.0 ml/g, and/or wherein the BET surface area is at least 10 m²/g, and/or wherein the attrition in accordance with ASTM D4058-87 is less than 5 wt %.

12. The body according to claim 1, wherein the ceramic body is a silica body.

13. The body according to claim 1, wherein the cross-section of the body has six axes of mirror symmetry.

14. The body according to claim 1, having a length L of from 2 to 10 mm and/or having a length L to maximum diameter 2 r2 ratio of from 1 to 3.

15. A process for preparing a body according to claim 1 by forming a ceramic or ceramic precursor paste, optionally cutting the extrudate, drying and optionally calcining the formed paste.

16. A catalyst, comprising at least one catalytically active material supported on a body according to claim 1.

17. The catalyst according to claim 16, wherein the catalytically active material is selected from the group consisting of metals, metal oxides, metal sulfides and combinations thereof.

18. The use of a body according to claim 1 in a chemical reaction, preferably in oxidation reactions.

* * * * *